(12) United States Patent
Cruz et al.

(10) Patent No.: US 10,969,308 B2
(45) Date of Patent: Apr. 6, 2021

(54) PARTICLE COLLECTOR

(71) Applicant: Seagate Technology LLC, Cupertino, CA (US)

(72) Inventors: Dennis Q. Cruz, Berthoud, CO (US); Richard Nguyen, Denver, CO (US); Jonathan P. Jones, Longmont, CO (US); Sumit Chandra, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 374 days.

(21) Appl. No.: 15/985,020

(22) Filed: May 21, 2018

(65) Prior Publication Data

US 2019/0353564 A1 Nov. 21, 2019

(51) Int. Cl.
*G01N 1/24* (2006.01)
*G01N 1/22* (2006.01)

(52) U.S. Cl.
CPC ............. *G01N 1/24* (2013.01); *G01N 1/2273* (2013.01); *G01N 2001/2223* (2013.01); *G01N 2001/244* (2013.01)

(58) Field of Classification Search
CPC .. G01N 1/24; G01N 1/2273; G01N 2001/244; G01N 2001/2223; G01N 1/2208; G01N 1/2214
See application file for complete search history.

(56) References Cited

U.S. PATENT DOCUMENTS

| | | |
|---|---|---|
| 4,189,937 A | 2/1980 | Nelson |
| 6,732,569 B2 | 5/2004 | Ondov et al. |
| 7,578,973 B2 | 8/2009 | Call et al. |
| 2009/0229639 A1 | 9/2009 | Metzner et al. |
| 2011/0072772 A1* | 3/2011 | Ariessohn ............. B01D 45/08 55/431 |
| 2015/0260617 A1* | 9/2015 | Ketcham ............. G01N 1/2208 73/863.22 |
| 2017/0136396 A1* | 5/2017 | Dahl .................... B01D 46/444 |

* cited by examiner

*Primary Examiner* — Herbert K Roberts
*Assistant Examiner* — John M Royston
(74) *Attorney, Agent, or Firm* — Faegre Drinker Biddle & Reath

(57) ABSTRACT

Aspects of the disclosure are directed to apparatuses and methods involving particulate sampling. As may be consistent with one or more embodiments, an apparatus includes a flow direction structure, a flow sampler and a particle collector having a collecting surface. The flow direction structure has interior sidewalls that direct the flow of particulate-laden gas along a flow path. The flow sampler is located in the flow path within the interior sidewalls, and operates with the flow direction structure to sample a portion of the particulate-laden gas at a reduced velocity, while allowing another portion of the particulate-laden gas to exhaust around the flow sampler. The flow sampler operates with the particle collector to direct the sampled portion of the particulate-laden gas to the collecting surface, and to adhere particulates from the particulate-laden gas to the collecting surface.

20 Claims, 4 Drawing Sheets

PARTICLE COLLECTOR

OVERVIEW

Various example embodiments are directed to methods and apparatuses involving particulate collection. Various such embodiments address issues that may relate to assessing cleanliness of manufacturing environments, in which problems may arise from the presence of dirt or other particulates that may contaminate goods being manufactured. For instance, various clean-room type environments involving the manufacture of hard disc drives and/or cleanliness of the hard disc drives themselves are desirably monitored to ensure a certain manufacturing quality. However, while various approaches to detecting cleanliness have been implemented, such approaches have experienced challenges. For instance, detecting the type of contamination can be challenging to effect in-line.

Various aspects of the present disclosure are directed to addressing such challenges. For instance, various embodiments are directed to assessing contaminants involving one or more of methods and apparatuses. Various such aspects involve collection and entrapment of particle constituents from incoming materials, tooling, and process assembly (e.g., for hard drive assembly). The collection may be in-line, non-intrusive, and non-destructive. A sufficient quantity of material sampling is carried out to clearly measure levels of contamination.

In accordance with particular embodiments, an apparatus includes a flow direction structure, a flow sampler and a particle collector having a collecting surface. The flow direction structure has interior sidewalls configured and arranged to direct the flow of particulate-laden gas along a flow path. The flow sampler is in the flow path and within the interior sidewalls, and is configured and arranged with the flow direction structure to sample a portion of the particulate-laden gas at a reduced velocity while allowing another portion of the particulate-laden gas to exhaust around the flow sampler. The particle collector has a collecting surface, with the flow sampler being configured and arranged with the particle collector to direct the sampled portion of the particulate-laden gas to the collecting surface and to adhere particulates from the particulate-laden gas to the collecting surface.

In accordance with a more particular embodiment, a hard disc drive assembly apparatus includes a purge component and arranged to dislodge particulates from a hard disc drive and to generate a flow of particulate-laden gas therefrom, along with a flow direction structure, a flow sampler and a particle collector having a collecting surface. The flow direction structure has interior sidewalls configured and arranged to direct the flow of particulate-laden gas along a flow path. The flow sampler is in the flow path and within the interior sidewalls, and is configured and arranged with the flow direction structure to sample a portion of the particulate-laden gas at a reduced velocity while allowing another portion of the particulate-laden gas to exhaust around the flow sampler. The particle collector has a collecting surface, with the flow sampler being configured and arranged with the particle collector to direct the sampled portion of the particulate-laden gas to the collecting surface and to adhere particulates from the particulate-laden gas to the collecting surface.

One or more embodiments are directed towards methods, such as may be implemented utilizing apparatuses characterized herein. In accordance with a particular embodiment, a method is carried out as follows. The flow of particulate-laden gas is directed along a flow path within interior sidewalls of a flow direction structure. A flow sampler in the flow path within the interior sidewalls is used to sample a portion of the particulate-laden gas at a reduced velocity while allowing another portion of the particulate-laden gas to exhaust around the flow sampler. Via the flow sampler, the sampled portion of the particulate-laden gas is directed to a collecting surface of a particle collector, and particulates from the particulate-laden gas are adhered to the collecting surface. For instance, the flow sampler may be used to reduce the velocity of the portion of the particulate-laden gas to increase the particle concentration of the particulate-laden gas provided to the particle collector. The flow path may be perpendicular to the collecting surface of the particle collector. In some instances, an inlet of the flow sampler is positioned such that a cross sectional area of the inlet lies within and is coplanar with a cross-sectional area of the flow direction structure between the sidewalls thereof. A gaseous portion of the particulate-laden gas may be exhausted around the collecting surface, after impacting the particles therein.

The above overview is not intended to describe each embodiment or every implementation of the present disclosure. The figures and detailed description that follow also exemplify various embodiments.

BRIEF DESCRIPTION OF FIGURES example embodiments may be more completely understood in consideration of the following detailed description in connection with the accompanying drawings, as depicted herein.

FIGS. 2A and 2B show perspective views of respective portions of a particle sampling apparatus, in which FIG. 2A shows a sampling nozzle and inlet and FIG. 2B shows a particle collector, as may be implemented in accordance with one or more embodiments.

Figure 1:
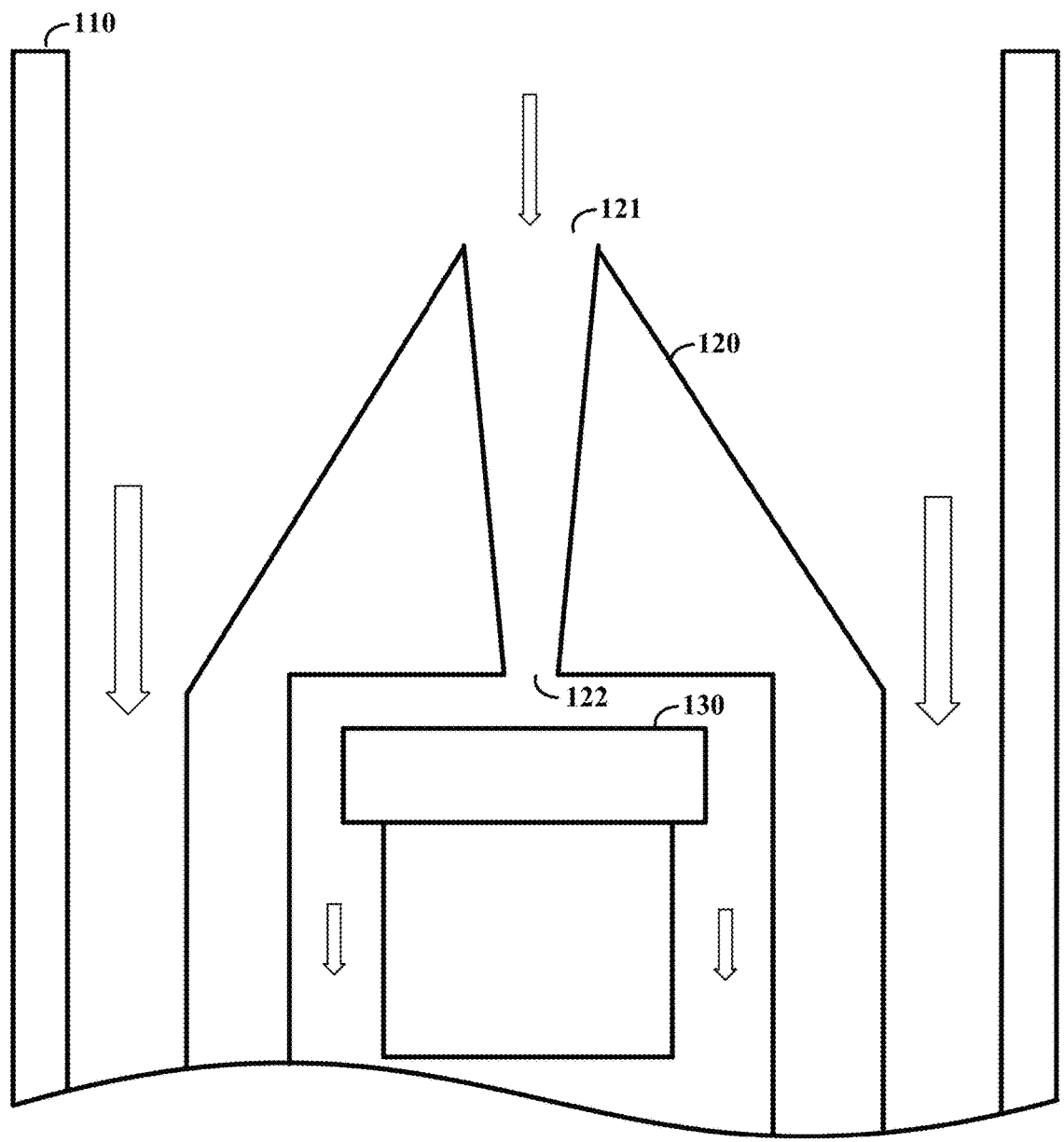
FIG. 1 shows an apparatus as may be implemented in accordance with one or more embodiments.
Figure 2A:
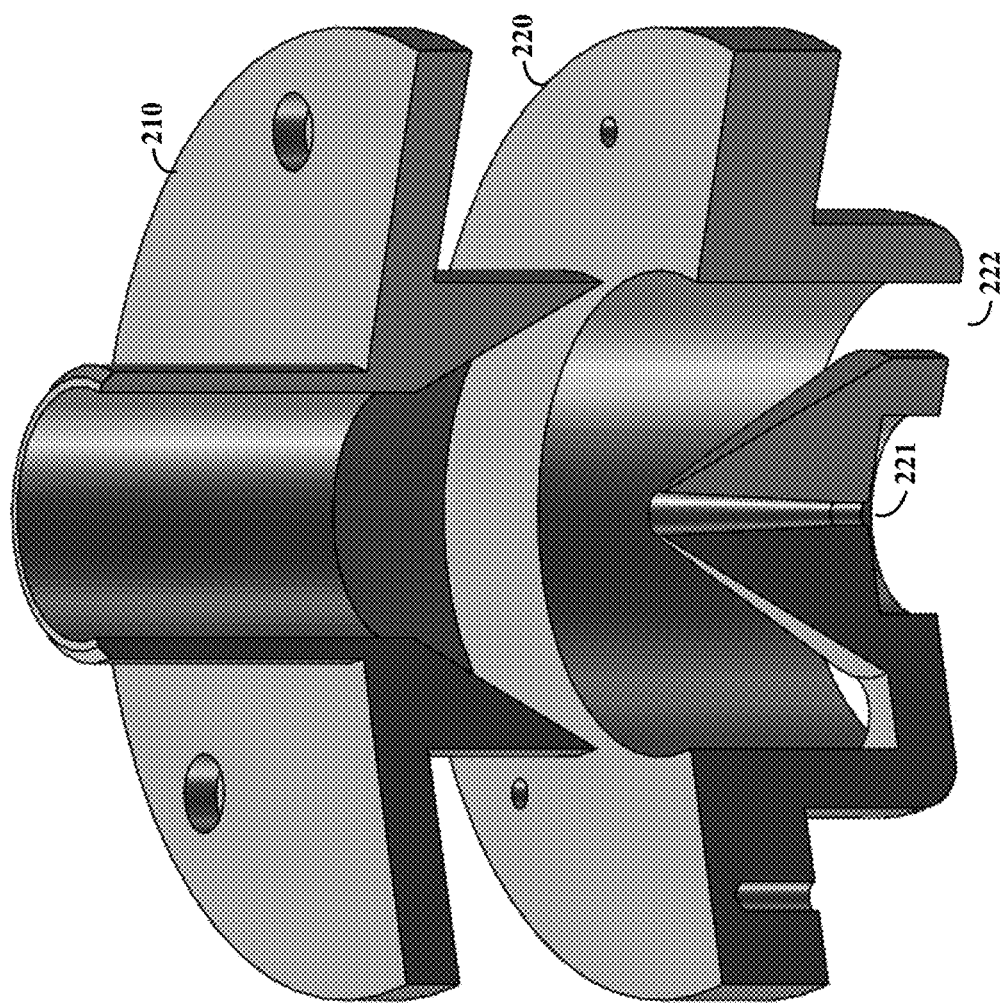
Figure 2B:
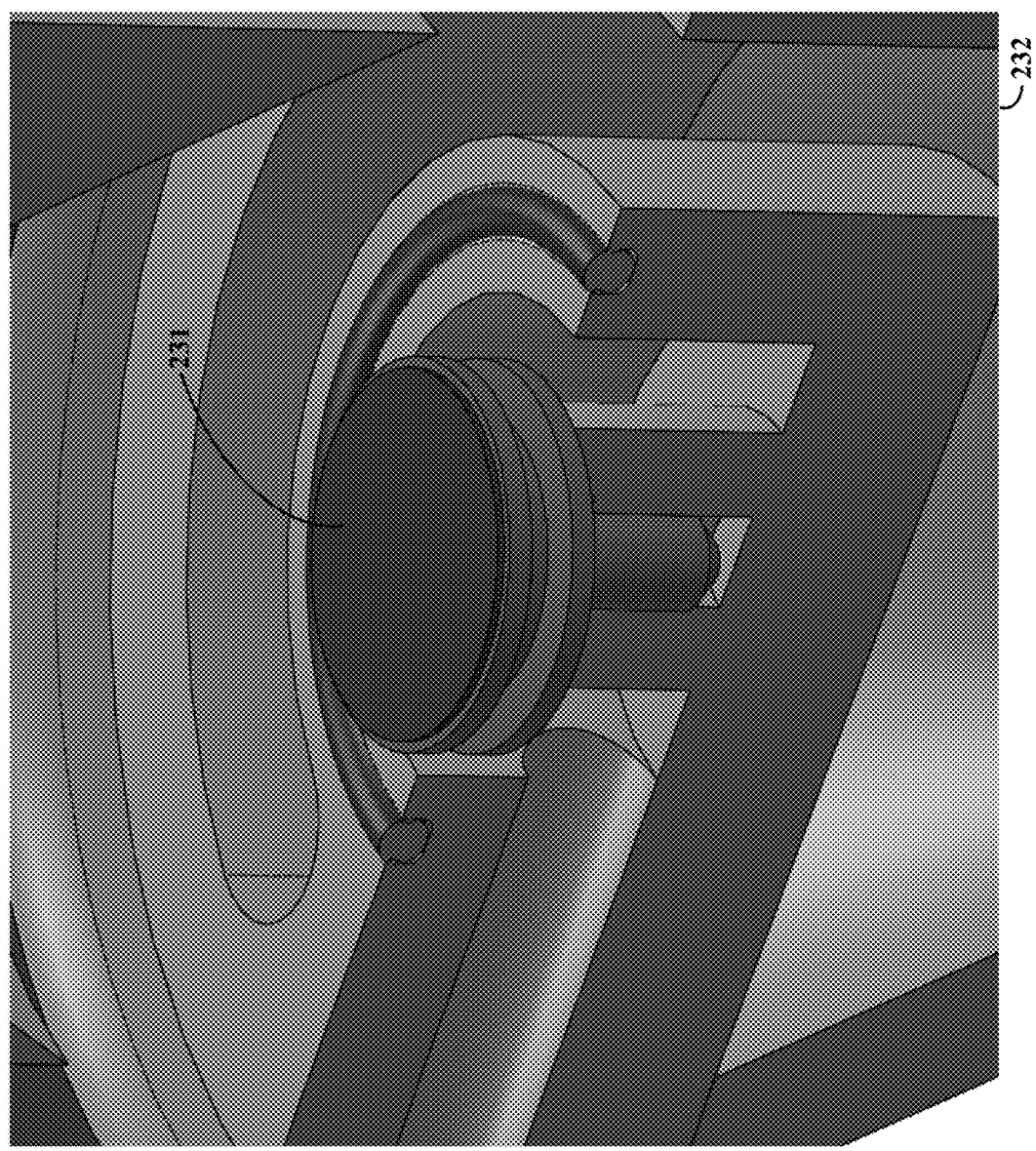
Figure 3:
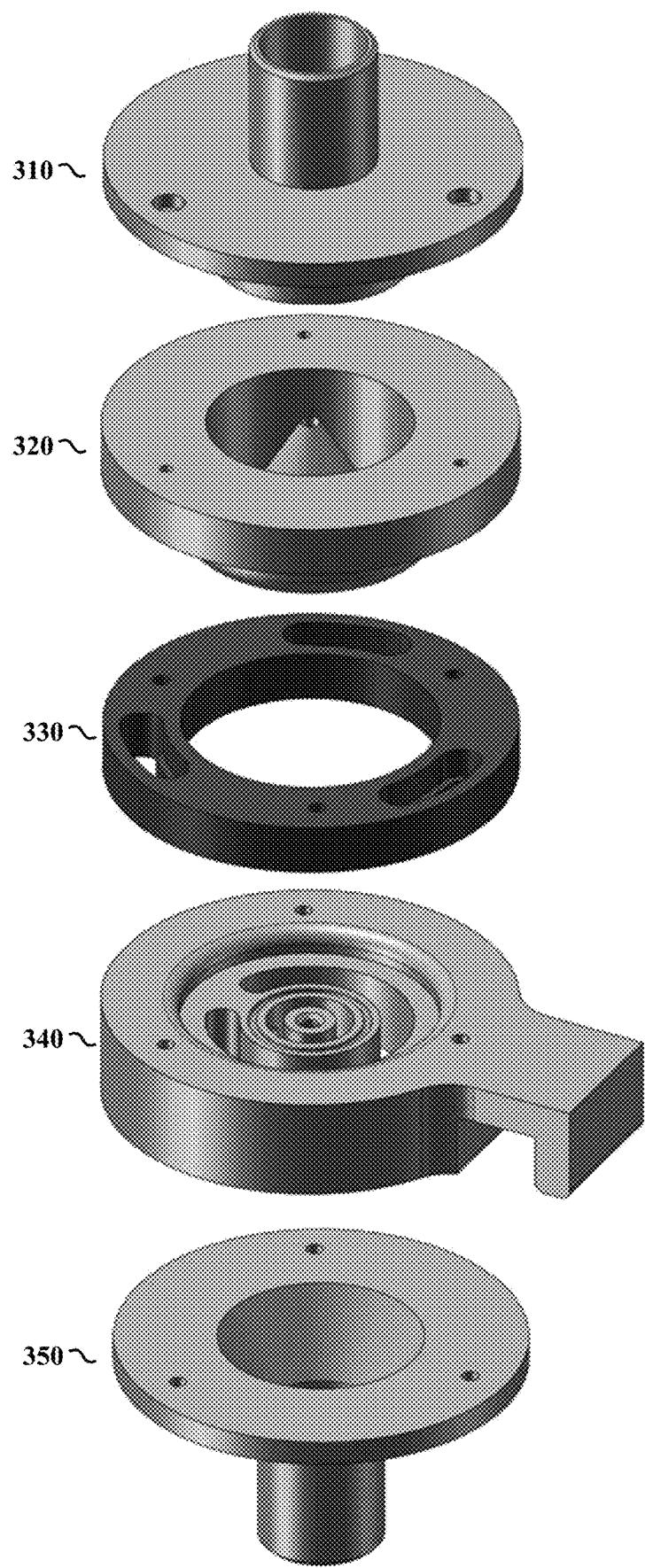
FIG. 3 shows an assembly view of a particle collector apparatus, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the detection of particulates. In certain implementations, aspects of the present disclosure have been shown to be beneficial when used in the context of analyzing contamination during or after manufacturing steps as may be applicable to electronic componentry and enclosures, such as those involving the manufacture of hard disc drives. While not necessarily so limited, various aspects may be appreciated through a discussion of examples using such exemplary contexts.

Various embodiments involve one or more of collecting particulates (e.g., for size and/or composition characterization), utilizing flow structures that facilitate sampling of a portion of particle-laden gas. In some implementations, the flow structures decrease the velocity of the sampled portion, relative to the impaction surface, to facilitate collection of a significant amount (e.g., majority) of particles from the particulate-laden gas. In this context, it has been recognized/ discovered that such an approach involving the control of gas velocity (e.g., sub-isokinetic, non-turbulent flow) can be used to accurately characterize the particulates. Such approaches may, for example, be used in characterizing levels of contamination in manufacturing environments, such as by characterizing levels of contamination in a hard disc drive apparatus.

One or more embodiments may be implemented with a real-time particle audit device (RTPAD) and purge and count (PAC) stations that purge finished products, such as an HDA, with clean dry air in order to remove and count loose particles from incoming components and particles generated by the assembly process. As parts are purged, particles can be collected from exhaust gas. Collected samples can then be analyzed for constituent identification, such as by using an offline scanning electron microscope (SEM). For instance, a particle impaction surface having a SEM-compatible carbon tape stub can be used for both sampling and processing.

Gas flow can be controlled to facilitate particle capture in a variety of manners. A low flow rate can be used to achieve less than 4500 Reynold's numbers at the impaction nozzle/ surface. A 5 SLPM rated vacuum ejector can be utilized for ejecting particles. The direction of the particle-laden gas stream from the inlet manifold to an isokinetic probe can be set perpendicular to the impaction surface. The point of impact surface is used to enhance the adhesive forces for impacted particles to adhere to. A carbon conductive substrate may be utilized, and placed on a SEM pin stub, which is mounted concentric with the isokinetic probe to serve as the impaction/adhesion surface. The carbon conductive substrate captures most of the impacted particles to the adhesive surface for further SEM analysis.

In particular implementations (e.g., using one of the above particle collection approaches), a portion of overall flow rate to the probe flow can be about 2.17%, with a concentrated particle percentage of 3.32%, and utilized to trap 81.43% of particles reaching the probe, or about 2.61% of total particles. Accordingly, in such an implementation with 2.17% of the flow going to the particle trap, more particles are collected due to sub-isokinetic conditions. The 81.4% trap rate may be facilitated in applications in which 17.7% of the particles are of 0.5 microns or less. For particle sizes greater than 0.5 micron, particle trap rates of 98.9% may be achieved.

In a more particular embodiment, an apparatus includes a flow direction structure, a flow sampler and a particle collector having a collecting surface. The flow direction structure has interior sidewalls that direct the flow of particulate-laden gas along a flow path, and the flow sampler is located in the flow path within the interior sidewalls. The flow sampler and flow direction structure operate together to sample a portion of the particulate-laden gas at a reduced velocity (e.g., sub-isokinetically), while allowing another portion of the particulate-laden gas to exhaust around the flow sampler. The flow sampler further operates with the particle collector to direct the sampled portion of the particulate-laden gas to the collecting surface (e.g., via non-turbulent flow), and to adhere particulates from the particulate-laden gas to the collecting surface. The velocity of the particulate-laden gas may be sufficiently reduced to cause the majority of the particles therein to adhere to the collecting surface of the particle collector when impacted thereupon.

In connection with one or more embodiments, it has been recognize/discovered that tuning a flow sampler such as noted above to provide reduced velocity can provide a representative sampling of a desired size range of particle types and sizes in the flow of particulate-laden gas. It has further been recognized/discovered that use of such a flow sampler along a flow path upstream of a collection surface facilitates collection of an accurate sampling of the desired range of particles in the particulate-laden gas flow.

The flow sampler may be implemented in a variety of manners. In some embodiments, the flow sampler reduces the velocity of the portion of the particulate-laden gas to increase the particle concentration of the particulate-laden gas provided to the particle collector. The flow sampler may be utilized to sample the portion of the particulate-laden gas along a path that is perpendicular to the collecting surface of the particle collector. In certain implementations, the flow sampler has an inlet and an outlet, with the outlet being smaller than the inlet and configured to concentrate the sampled flow as it passes from the inlet to the outlet, and to impact the concentrated sampled flow upon the collecting surface.

In certain embodiments, the flow sampler has an inlet having a cross sectional area that lies within, and is coplanar with, a cross-sectional area of the flow direction structure between the sidewalls thereof. In a more particular embodiment, the flow sampler operates with the flow direction structure to flow the particulate-laden gas to the cross-sectional area of the flow-direction structure, and to reduce the velocity of the sampled portion of the particulate-laden gas passing through the flow sampler, relative to the other portion of the particulate-laden gas that continues to exhaust around the flow sampler.

In a more particular embodiment, the sidewalls of the flow direction structure are vertical and are configured and arranged to direct the flow of the particulate-laden gas in a first direction. The flow sampler extends vertically within the sidewalls and is configured and arranged to sample the portion of the particulate-laden gas along the first direction, in parallel with the flow of the other portion of the particulate-laden gas flowing around the flow sampler. The collecting surface is perpendicular to the flow direction of the sampled portion of the particulate-laden gas as it enters the flow sampler, is positioned downstream of the flow sampler, and is configured and arranged with the flow sampler to cause impaction of the particulates in the sampled portion of the particulate-laden gas along the first direction and perpendicular to the collecting surface. In such an embodiment, the flow sampler may be implemented with internal sidewalls extending from an inlet along said flow direction and terminating at an impaction outlet that is upstream in the flow direction from the collecting surface, the with an entire cross-sectional area of the impaction outlet facing the collecting surface.

In one or more embodiments characterized above, an exhaust outlet may be utilized to exhaust the sampled gas carrying the particulate-laden particles, after it has flowed through the particle collector. Correspondingly, first and second exhaust outlets may be used, with the first exhaust outlet configured and arranged to exhaust the portion of the particulate-laden gas that flows around the flow sampler, and the second exhaust outlet configured and arranged to exhaust the sampled particulate-laden gas after the particulates therein have been adhered to the collecting surface.

Turning now to the figures, FIG. 1 shows a cross-sectional view of an apparatus 100 for sampling particulates in gas flow. The apparatus 100 includes an outer flow-direction structure having sidewalls 110 that directs the flow of particulate-laden gas, and a sampling structure 120 that samples a portion of the flow via inlet 121. The sampling structure 120 has a nozzle 122 that concentrates particulates in the sampled gas flow, and directs the concentrated flow to an impaction surface of a particle collector 130 that collects particulates from the sampled gas flow. The sampling structure 120 and nozzle 122 characteristics facilitate a reduction in velocity of the sampled flow, which further facilitates collection at the impaction surface. Arrows in the figure show the general flow direction of gas, with the majority of the gas flowing around the sampling structure 122.

In various embodiments, utilizing approaches characterized herein, the tendency of particulates to bounce off of the impaction surface may be mitigated by controlling gas flow (e.g., sub-isokinetic, non-turbulent flow). The taper from the inlet 121 to the nozzle 122 at the exhaust may facilitate smooth isokinetic gas flow at the inlet, with the nozzle diameter facilitating concentration and flow control for the capture of desirable particulate sizes.

The apparatus in FIG. 1 and/or others as characterized herein may be implemented as follows. With a 230 SLPM (~8 CFM) flow rate at the chamber (e.g., within sidewalls 110), 1 CFM is sampled and the remaining ~7 CFM flows to exhaust. The following relationship can be used to tune the probe diameter to the isokinetic efficiency of 120%:

$$\eta_{isokinetic} = \frac{V_{bulk}}{V_{probe}} = 1.2$$

The cutoff diameter of particles to be collected can be calculated using Stoke's number $$Stk = \frac{\rho_p d_p^2 V_{impaction} C_c}{9 \mu D_j} \therefore d_{50} = \sqrt{\frac{9 \mu D_j}{\rho_p V_{impaction} C_c} Stk_{50}},$$

where the jet diameter is determined by the desired Reynold's number, $$Re = \frac{\rho V_{impaction} D_j}{\mu} = \frac{4 \rho Q_{vacuum}}{\pi \mu D_j} \therefore D_j = \frac{4 \rho Q_{vacuum}}{\pi \mu Re},$$

and wherein:
$\rho_p$=particle density
$d_p$=cutoff diameter
$C_c$=slip correction factor
$\mu$=air dynamic viscosity
$D_j$=nozzle/jet diameter
$Stk_{50}$=Stoke's number (0.24 for circular jets)
$d_{50}$=50% cutoff diameter
Q volumetric flow rate FIGS. 2A and 2B show perspective views of respective portions of a particle sampling apparatus, as may be implemented in accordance with one or more embodiments. Beginning with FIG. 2A, a flow direction structure 210 is shown with a round opening, such as may be fed by an exhaust tube, positioned for assembly to a flow sampler 220 (e.g., with a flange as shown in FIG. 3). The flow sampler 220 has a nozzle 221, tapered from an upper inlet to a lower exhaust. Un-sampled portions of the gas flow are exhausted at 222. In FIG. 2B, a particle sampling structure 230 includes an impaction surface 231, which may be part of a pin or other type of structure useful for further analysis (e.g., via SEM). Portions of the sampled gas are then exhausted at 232, after impaction of particles therein upon the impaction surface 231.

FIG. 3 shows an assembly view of a particle collector apparatus, as may be implemented in accordance with one or more embodiments. An inlet 310 is configured for coupling to a sampling component 320, having a nozzle for sampling flow while allowing a majority of flow entering via the inlet to pass. A flange 330 couples the sampling component 320 to a particle collector 340, which is configured to accept an impaction surface (e.g., as shown in FIG. 2) for collection of particulates and subsequent removal for analysis. An exhaust outlet 350 is configured for coupling to the particle collector 340, and exhausting gas passed around the sampling component 320 (and may also exhaust gas passing through the particle collector).

Based upon the above discussion and illustrations, those skilled in the art will readily recognize that various modifications and changes may be made to the present disclosure without strictly following the exemplary embodiments and applications illustrated and described herein. For example, different types of flow direction structures, such as hoses, funnels, exhausts and more, may be utilized with a flow sampling apparatus as noted herein. Different types of nozzles may be used to concentrate and sample particulate-laden gas. Other in-line sampling collectors may also be used, and may involve real-time particulate analysis. Further, while various example materials, sizes and arrangements are shown in the figures and/or described, such aspects may be implemented in embodiments involving other materials, sizes or arrangements. Such modifications do not depart from the true spirit and scope of the present disclosure, including that set forth in the following claims.

What is claimed is:

1. An apparatus comprising:

a flow direction structure having an interior sidewall configured and arranged to direct the flow of particulate-laden gas along a flow path;

a flow sampler in the flow path and within the interior sidewall, the flow sampler including an inlet and being configured and arranged with the flow direction structure to sample a portion of the particulate-laden gas at a reduced velocity, wherein the flow sampler is arranged such that a portion of the particulate-laden gas enters the inlet while another portion of the particulate-laden gas does not enter the inlet and passes around an exterior wall of the flow sampler between the flow sampler and the interior sidewall; and a particle collector having a collecting surface, the flow sampler being configured and arranged with the particle collector to direct the sampled portion of the particulate-laden gas to the collecting surface and to adhere particulates from the particulate-laden gas to the collecting surface.

2. The apparatus of claim 1, wherein the flow sampler is configured and arranged to reduce the velocity of the portion of the particulate-laden gas to increase the particle concentration of the particulate-laden gas provided to the particle collector.

3. The apparatus of claim 1, wherein the flow sampler is configured and arranged to sample the portion of the particulate-laden gas along a path that is perpendicular to the collecting surface of the particle collector.

4. The apparatus of claim 1, wherein:
the sidewall of the flow direction structure is vertical and is configured and arranged to direct the flow of the particulate-laden gas in a first direction;
the flow sampler extends vertically within the sidewall and is configured and arranged to sample the portion of the particulate-laden gas along the first direction, in parallel with the flow of the other portion of the particulate-laden gas flowing around the flow sampler; and
the collecting surface is perpendicular to the flow direction of the sampled portion of the particulate-laden gas as it enters the flow sampler, is positioned downstream of the flow sampler, and is configured and arranged with the flow sampler to cause impaction of the particulates in the sampled portion of the particulate-laden gas along the first direction and perpendicular to the collecting surface.

5. The apparatus of claim 4, wherein the flow sampler has internal sidewalls extending from the inlet along said flow direction and terminating at an impaction outlet that is upstream in the flow direction from the collecting surface.

6. The apparatus of claim 4, further including an exhaust outlet configured and arranged to exhaust the sampled gas carrying the particulate-laden particles, after it has flowed through the particle collector.

7. The apparatus of claim 1, further including a first exhaust outlet configured and arranged to exhaust the other portion of the particulate-laden gas that flows around the flow sampler, and a second exhaust outlet configured and arranged to exhaust the sampled particulate-laden gas after the particulates therein have been adhered to the collecting surface.

8. The apparatus of claim 1, wherein the flow sampler is configured and arranged to cause the sampled portion of the particulate-laden gas to flow sub-isokinetically.

9. The apparatus of claim 1, wherein the flow sampler is configured and arranged to cause non-turbulent flow of the sampled portion of the particulate-laden gas at an outlet of the flow sampler.

10. The apparatus of claim 1, wherein the flow sampler is configured and arranged to sample a size range of particulates in the particulate-laden gas, facilitating identification of the type of each of the particulates in the size range via subsequent analysis of the collecting surface.

11. The apparatus of claim 1, wherein the flow sampler has an outlet, the outlet being smaller than the inlet and the flow sampler being configured and arranged to concentrate the sampled flow as it passes from the inlet to the outlet, and to impact the concentrated sampled flow upon the collecting surface.

12. The apparatus of claim 1, wherein the flow sampler is configured and arranged to reduce the velocity of the portion of the particulate-laden gas to cause the majority of the particles therein to adhere to the collecting surface of the particle collector when impacted thereupon.

13. The apparatus of claim 1, wherein the flow sampler has an interior flow path with a cross section size that continuously decreases from the inlet to a first outlet of the flow sampler.

14. A hard disc drive assembly apparatus comprising:
a purge component, configured and arranged to dislodge particulates from a hard disc drive and to generate a flow of particulate-laden gas therefrom;
a flow direction structure having an interior sidewall configured and arranged to direct the flow of particulate-laden gas along a flow path;
a flow sampler in the flow path and within the interior sidewall to create a gap between an exterior wall of the flow sampler and the interior sidewall, the flow sampler having an inlet and being configured and arranged with the flow direction structure to sample a portion of the particulate-laden gas at a reduced velocity;
wherein the flow sampler is arranged such that a portion of the particulate-laden gas enters the inlet while another portion of the particulate-laden gas enters the gap and passes around the flow sampler; and
a particle collector having a collecting surface, the flow sampler being configured and arranged with the particle collector to direct the sampled portion of the particulate-laden gas to the collecting surface and to adhere particulates from the particulate-laden gas to the collecting surface.

15. A method comprising:
directing the flow of particulate-laden gas along a flow path within an interior sidewall of a flow direction structure;
directing a portion of the particulate-laden gas through an inlet of a flow sampler positioned in the flow path within the interior sidewall;
sampling, at a reduced velocity, the portion of the particulate-laden gas that passes through the inlet;
directing another portion of the particulate-laden gas away from the inlet to exhaust around an exterior wall of the flow sampler;
directing, via the flow sampler, the sampled portion of the particulate-laden gas to a collecting surface of a particle collector; and
adhering particulates from the particulate-laden gas to the collecting surface.

16. The method of claim 15, further including using the flow sampler to reduce the velocity of the portion of the particulate-laden gas to increase the particle concentration of the particulate-laden gas provided to the particle collector.

17. The method of claim 15, wherein the flow path is perpendicular to the collecting surface of the particle collector.

18. The method of claim 15, wherein using the flow sampler for sampling the portion of particulate-laden gas includes positioning the inlet of the flow sampler such that a cross sectional area of the inlet lies within and is coplanar with a cross-sectional area of the flow direction structure between the sidewalls thereof.

19. The method of claim 15, further including exhausting a gaseous portion of the particulate-laden gas, after impacting the particles therein, around the collecting surface.

20. The hard disc drive assembly apparatus of claim 14, wherein the flow sampler has an interior flow path with a cross section size that continuously decreases from the inlet to a first outlet of the flow sampler.

* * * * *